United States Patent [19]

Vincent

[11] Patent Number: 5,369,793
[45] Date of Patent: Nov. 29, 1994

[54] RF RECEIVER ADAPTED TO PROCESS RECEIVED RF PULSES AND REJECT RF CONTINUOUS WAVE SIGNALS

[75] Inventor: Sherman R. Vincent, Santa Barbara, Calif.

[73] Assignee: Raytheon Company, Lexington, Mass.

[21] Appl. No.: 806,973

[22] Filed: Dec. 12, 1991

[51] Int. Cl.$^5$ .............................................. H04B 1/10
[52] U.S. Cl. ..................................... 455/306; 455/307; 455/340
[58] Field of Search ................ 455/303, 306, 307, 339, 455/340, 182.3, 192.3; 375/99, 103

[56] References Cited

U.S. PATENT DOCUMENTS

| | | | |
|---|---|---|---|
| 4,395,779 | 7/1983 | Fujino et al. | 455/307 |
| 4,584,580 | 4/1986 | Fujino et al. | 455/306 |
| 4,662,001 | 4/1987 | Cruz et al. | 455/302 |

FOREIGN PATENT DOCUMENTS

| | | | |
|---|---|---|---|
| 0212928 | 9/1986 | Japan | 455/303 |

*Primary Examiner*—Curtis Kuntz
*Assistant Examiner*—Doris H. To
*Attorney, Agent, or Firm*—William R. Clark

[57] ABSTRACT

A power divider couples a received signal to a pair of signal channels. The first channel includes a pulse signal processor coupled to the power divider through a band reject filter. The second channel includes a continuous wave signal detector and processor coupled to the power divider through a bandpass filter. The bandpass and band reject filters are responsive to a control signal for tuning the center frequencies of the respective pass band and reject band to a frequency within a predetermined range of frequencies. The continuous wave signal detector and processor determines the frequency of a detected continuous wave signal using the first channel, and tunes, by producing the above-mentioned control signal, the center frequencies of the bandpass and band reject filters to the frequency of the detected continuous wave signal. The band reject filter rejects the continuous wave signal in the first channel. The continuous wave signal detector and processor then monitors the second channel to detect the absence of the detected continuous wave signal.

8 Claims, 3 Drawing Sheets

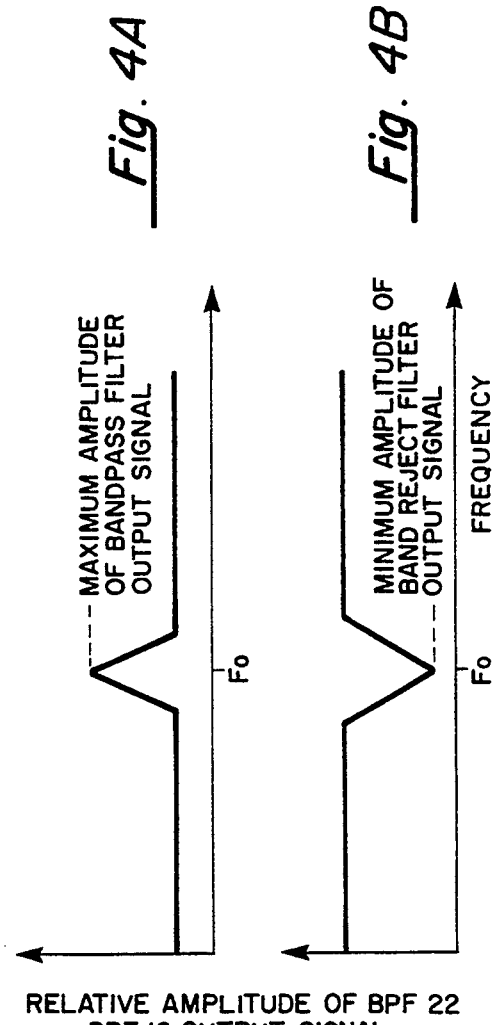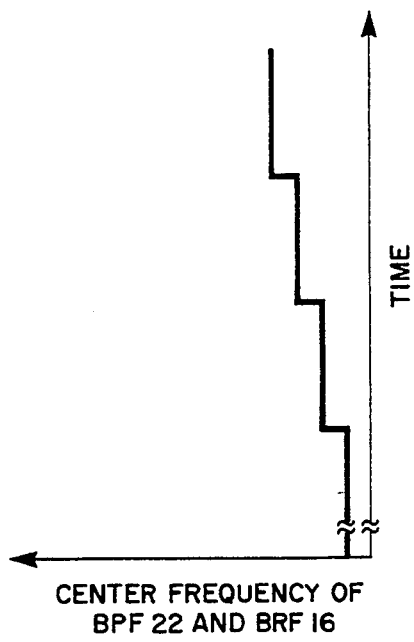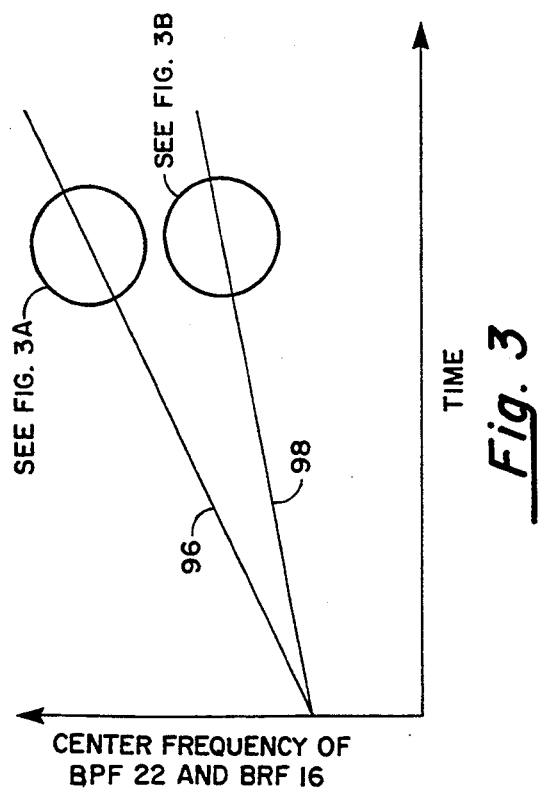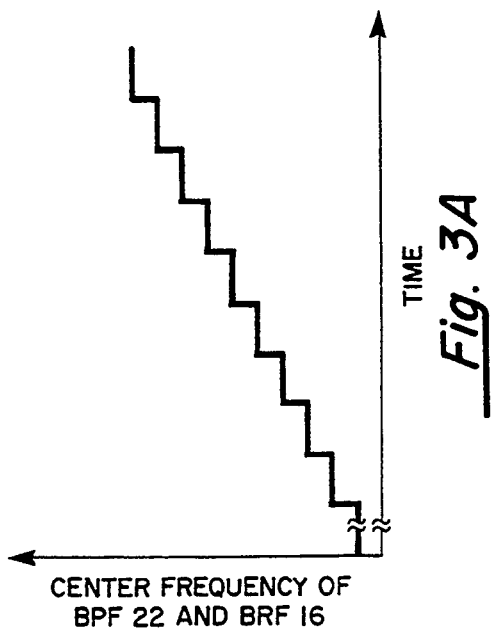

RF RECEIVER ADAPTED TO PROCESS RECEIVED RF PULSES AND REJECT RF CONTINUOUS WAVE SIGNALS

BACKGROUND OF THE INVENTION

The present invention relates generally to radio frequency (R.F.) receivers and more particularly to R.F. receivers adapted to process received R.F. pulses and reject received R.F. continuous wave (CW) signals.

As is known in the art a CW signal is a signal with a time duration substantially longer than the time duration of a single pulse from a pulsed signal. In R.F. receivers adapted to process received R.F. pulses, strong CW signals may interfere with the reception of the desired pulsed signals, especially if the frequencies of the CW signals are close in frequency to the carrier frequencies of the pulsed signals. For this reason, it is often desirable to filter out strong CW signals.

One method for filtering out, or tuning out a CW signal, while allowing pulsed signals to pass through for processing, is to provide a notch, or band reject filter whose center frequency is tuned to the frequency of the CW signal. Thus all received signals except those having a frequency within the notch of the band reject filter are passed for processing. Where multiple CW signals are present in the frequency band of interest, it is common for only one band reject filter to be used. This one band reject filter is tuned to filter out the strongest CW signal present in the frequency band of interest. Often, a YIG (yittrium-iron-garnet) filter is used as the band reject filter because it can be used at frequencies in the GHz range, and its band reject center frequency can be tuned over a very broad frequency range.

With such method, the reject band of the band reject filter is first tuned below the lowest frequency in a predetermined band of interest so that all frequencies within the predetermined frequency band pass to a CW signal detector. The CW signal detector determines if a received signal is a CW signal by comparing its time duration with a predetermined time duration threshold. If the time duration of the received signal exceeds the threshold, then the received signal is characterized as a CW signal. The YIG control circuit then tunes the center frequency of the band reject filter to a frequency which is slightly below the frequency band of interest. The center frequency of the band reject filter is then increased in successive steps of frequency so as to sweep through the frequency band of interest. After each step, the amplitude of the band reject filter output signal is compared to the value of a variable which is equal to the smallest amplitude of the band reject filter output signal previously measured during the present sweep. If the amplitude of the band reject filter output signal is larger than the value of the variable, then this amplitude is discarded. If the amplitude of the band reject filter output signal is less than the value of the variable, then the variable takes on a new value which is equal to the amplitude of the band reject filter output signal. In addition, the YIG control circuit stores the center frequency of the band reject filter associated with the lowest amplitude previously measured during the sweep. After the YIG control circuit has finished the sweep, the center frequency of the band reject filter is set at the frequency where the minimum amplitude occurred, i.e. the frequency where maximum CW signal rejection occurred. The band reject filter now provides maximum rejection of the strongest CW signal present within the frequency band of interest.

When the CW signal is no longer present within the frequency band of interest, the reject band of the band reject filter is returned to a frequency outside of the frequency band of interest. This allows all frequencies within the frequency band of interest to pass through the filter for processing. Since the CW signal is being rejected by the band reject filter, there will be very small change in the filter output when the CW signal is no longer present. This small change in the filter output may be too small for the post-filter circuitry to detect the absence of the CW signal with the required accuracy. Therefore, to obtain more accurate CW signal "absence" detection, the center frequency of the band reject filter is periodically tuned to another frequency away from the frequency of the previously detected CW signal, in order that the post-filter circuitry is able to measure the amplitude of this CW signal and determine if this CW signal is still present.

While such method may be useful in some applications, the time required to periodically tune the center frequency of the band reject filter away from the frequency of the previously detected CW signal to determine if this CW signal is still present may be excessive. A second problem with such method is that the periodic tuning of the center frequency of the band reject filter to a frequency away from that of the previously detected CW signal may cause distortion to the amplitudes of the pulses of interest. Additionally, when a pulse, with a carrier frequency at, or near, the frequency of the CW signal occurs during the sweep process and the center frequency of the filter is at the frequency of the CW signal, a false amplitude reading may occur. If this false amplitude is larger than any of the other amplitudes measured during the sweep, then the center frequency of the band reject filter will be tuned to an incorrect frequency. That is, the center frequency of the band reject filter will be tuned to a frequency other than that frequency required to provide maximum rejection of the CW signal.

SUMMARY OF THE INVENTION

In accordance with the foregoing, it is an object of the present invention to provide an improved radio frequency receiver.

It is another object of the invention to provide an improved radio frequency receiver adapted to process received RF pulses and reject received CW signals.

These and other objects are attained generally by providing a power divider means for coupling a received signal to a pair of signal channels. A first one of such signal channels includes a pulse signal processor coupled to the power divider means through a band reject filter having a frequency reject band with a center frequency tuneable to a frequency within a predetermined band of frequencies. A second one of the signal channels includes a CW signal detector and processor coupled to the power divider means through a bandpass filter having a frequency pass band with the center frequency tuneable to the frequency within the predetermined band of frequencies. The CW signal detector and processor includes means for determining the frequency of the detected CW signal and for tuning both the center frequency of the reject band and the center frequency of the pass band to the frequency of the CW signal.

With such a two channel arrangement the reject band does not have to be moved periodically to determine if the CW signal is still present. Hence, amplitude distortion of the pulses is prevented and incorrect reject frequency tuning can be quickly detected.

More particularly, as the pass band center frequency of the bandpass filter is swept over the predetermined frequency band, the amplitude of the bandpass filter output is monitored, and the maximum amplitude and the frequency at which this maximum occurs are stored by a storing means. The center frequencies of the bandpass filter and the band reject filter are then tuned to the frequency at which the maximum amplitude of the bandpass filter output signal occurred. When the amplitude of the output signal of the bandpass filter falls below a predetermined threshold, the center frequency of the band reject filter is tuned out of the predetermined frequency band. Thus, if a pulse were to carry a frequency close to the frequency of the CW signal and occur during the frequency sweep of the center frequency of the bandpass filter, thereby giving a false maximum amplitude, the error will be detected quickly when the pulse is no longer present, as the amplitude of the bandpass filter output signal will fall below the predetermined threshold. The apparatus rapidly responds to the cessation of the CW signal by detecting when the amplitude of the bandpass filter output signal falls below the predetermined output threshold. The center frequency of the band reject filter does not have to be moved periodically to determine if the CW signal is still present.

BRIEF DESCRIPTION OF THE DRAWINGS

For a more complete understanding of the concept of this invention, reference is now made to the following description taken in conjunction with the accompanying drawings, in which:

FIG. 3 is a drawing of curves showing the relationship between time and the center frequency of a bandpass filter (BPF) and a band reject filter (BRF) used in the receiver of FIG. 1 during a coarse sweep and a fine sweep;

FIG. 3A is a drawing showing an exploded portion of the one of the curves of FIG. 3 showing the relationship between time and the center frequency of a bandpass filter (BPF) and a band reject filter (BRF) used in the receiver of FIG. 1 for the coarse sweep;

FIG. 3B is a drawing showing an exploded portion of the one of the curves of FIG. 3 showing the relationship between time and the center frequency of a bandpass filter (BPF) and a band reject filter (BRF) used in the receiver of FIG. 1 for the fine sweep;

FIG. 4A is drawing showing the frequency response for the bandpass filter (BPF) having a center frequency, $F_o$, used in the receiver of FIG. 1; and FIG. 4B is drawing showing the frequency response for the band reject filter (BRF) having a center frequency, $F_o$, used in the receiver of FIG. 1.

DESCRIPTION OF THE PREFERRED EMBODIMENT

Figure 1:
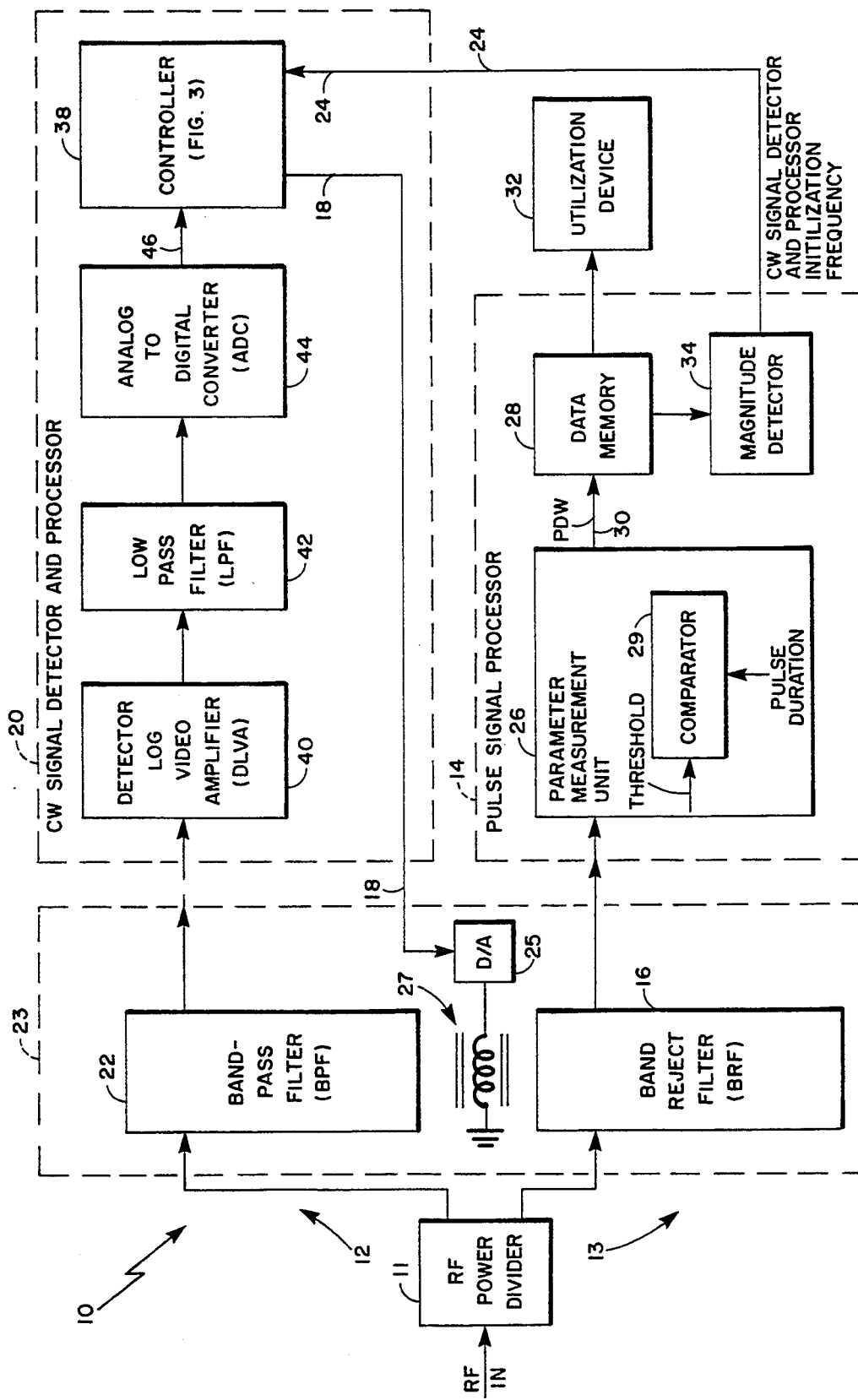
FIG. 1 is a block diagram of a radio frequency receiver adapted to process received R.F. pulses and reject received R.F. CW signals according to the invention.

Referring to FIG. 1, a radio frequency receiver 10 is shown to include a power divider 11 for coupling a received radio frequency signal to a pair of signal channels 12, 13, as shown. A first one of such pair of signal channels, here signal channel 13, includes a pulse signal processor 14 coupled to the power divider 11 through a band reject filter (BRF) 16. A second one of the pair of signal channels, here signal channel 12, includes a CW signal detector and processor 20, coupled to the power divider 11 through a bandpass filter (BPF) 22, as shown. It is noted that the BRF 16 and the BPF 22 are here a pair of YIG filters disposed within a common magnetic shell 23. One such shell 23 is manufactured by Ferretec of Fremont, CA, Model No. FD2324. Also included in the shell 23 are a digital to analog converter (DAC) 25 and a common tuning coil 27, as shown. The BRF 16 is magnetically coupled to common tuning coil 27. In response to a magnetic field produced by common tuning coil 27, such field having a strength in accordance with the digital word fed to DAC 25 via control line 18, tunes the center frequency of a frequency reject band of BRF 16 to a frequency within a predetermined band of frequencies (i.e. the receiver bandwidth). The BPF 22 is also magnetically coupled to common tuning coil 27. In response to the same magnetic field produced by common tuning coil 27, and hence in response to the same control signal produced by CW signal detector and processor 20, tunes the center frequency of a frequency pass band of BPF 22 to a frequency within the predetermined band of frequencies. The CW signal detector and processor 20 determines the frequency of the detected CW signal and produces the control signal on line 18 for the BRF 16 and the BPF 22 to, subsequent to an initialization phase, tune the center frequencies of both the BRF 16 and the BPF 22 to the frequency of the received CW signal with the greatest amplitude. Thus, subsequent to the initialization phase, a received CW signal is rejected by the BRF 16 and pulse signal processor 14 processes only received pulses, and BPF 22 passes only received CW signal with the greatest amplitude to the CW detector and processor 20.

More specifically, during an initialization phase the CW signal detector and processor 20 produces the control signal on line 18 to commonly (i.e. synchronously) tune both the reject band and the pass band of the BRF 16 and BPF 22, respectively, (as described above) outside of the bandwidth of the receiver 10. Thus, pulse signal processor 14 detects the presence of all signals having frequencies within the bandwidth of receiver 10. The frequency, and pulse duration, inter alia, of each one of the received signals is determined by the pulse signal processor 14. (Apparatus for determining these characteristics is described in U.S. Pat. No. 4,217,580, Electronic Countermeasure System, issued Aug. 12, 1980 inventor Oscar Lowenschuss, and assigned to the same assignee as the present invention. As described therein, these characteristics of each received signal are converted by a parameter measuring unit 26 into a digital word, hereinafter sometimes referred to as a pulse descriptor word (PDW)). The pulse signal processor 14 determines whether, based on pulse duration, any of the received signals is a CW signal. Upon such determination, the frequency of the one of the received CW signals having the greatest amplitude is transmitted to the CW signal detector and processor 20 via line 24 as an initialization frequency. In response to the initialization frequency, CW signal detector and processor 20 commences a sweep of the center frequencies of a BPF 22 and of the BRF 16 across the frequency band of interest beginning at a frequency slightly less than the initialization frequency. The initialization phase is then terminated.

Continuing then, in response to received signals having frequencies within the narrow pass band of the BPF 22 as the pass band is swept over the frequency band of interest, CW signal detector and processor 20 again determines the frequency of the detected CW signal having the greatest amplitude. Now, however, the frequency is determined to a greater accuracy because the bandwidth of the signals passing to the CW detector and processor 20 is less than the bandwidth of the signals passing to the pulse signal processor 14. The CW signal detector and processor 20 then tunes the center frequencies of both filters 16 and 22 to the frequency of the detected CW signal. The center frequencies of both filters 16 and 22 are now at the CW signal frequency. Now the BRF 16 filters out the CW signal, and BPF 22 passes only the previously detected CW signal to CW signal detector and processor 20 to provide continuous information on the presence, or absence, of the detected CW signal. The center frequency of the BRF 16 remains at this optimum CW rejection frequency until the amplitude of the signal output from BPF 22 falls below a predetermined threshold level, indicating the absence of the previously detected CW signal. Upon detection of the absence of the previously detected CW signal, CW signal detector and processor 20 returns the reject band and the pass band of BRF 16 and BPF 22 respectively to frequencies outside the frequency band of interest, thereby restarting the initialization phase.

Thus by providing the BPF 22 in a signal channel 12 separate from the signal channel of the BRF 16, the reject band of BRF 16 does not have to be periodically tuned to a frequency away from the frequency of the previously detected CW signal. Further the use of a separate channel 12 enables continuous use of a BPF 22 to monitor the amount of energy received from both CW signals and large, short duration, pulse signals having frequencies near the frequency of the CW signal, the reception of which, during the sweep, might otherwise result in frequency tuning errors. That is, let it be assumed that the frequency of the BPF 22 had been tuned to an incorrect frequency because of the reception of a large pulse having a frequency near the frequency of a detected CW signal. After the sweep by the CW signal processor and detector 20 the termination of such pulse is detected because the energy passing though the BPF 22 will fall below the predetermined threshold level thereby recommencing the initialization process.

Pulse signal processor 14 is shown to include a parameter measurement unit (PMU) 26, such as that described in the above mentioned U.S. Pat. No. 4,217,580, and a data memory 28. The PMU 26 determines, inter alia: the frequency of the received signal; the amplitude of the received signal; and, based on a determined pulse duration relative to a predetermined time duration (selected to define a CW signal), whether the received signal is a pulsed signal or a CW signal. That is, PMU 26 determines whether a received signal is a pulsed signal or a CW signal by comparing, in comparator 29, its time duration (i.e. pulse duration) with a predetermined time duration threshold. Any received signals having time durations exceeding the predetermined time duration threshold are characterized as CW signals. The PMU 26 then generates a digital number for each of the characterizations and sends this digital information over bus 30 to data memory 28 for storage and use by a suitable utilization device 32 (FIG. 1), as for example that shown in the above mentioned U.S. Patent. A magnitude detector 34, the function of which may be performed by a digital computer, determines which CW signal has the greatest amplitude. The frequency of such CW signal, that is the above described initialization frequency, is then transmitted over 8 bit bus 24 to controller 38 of CW detector and processor 20 (FIG. 1).

Figure 2:
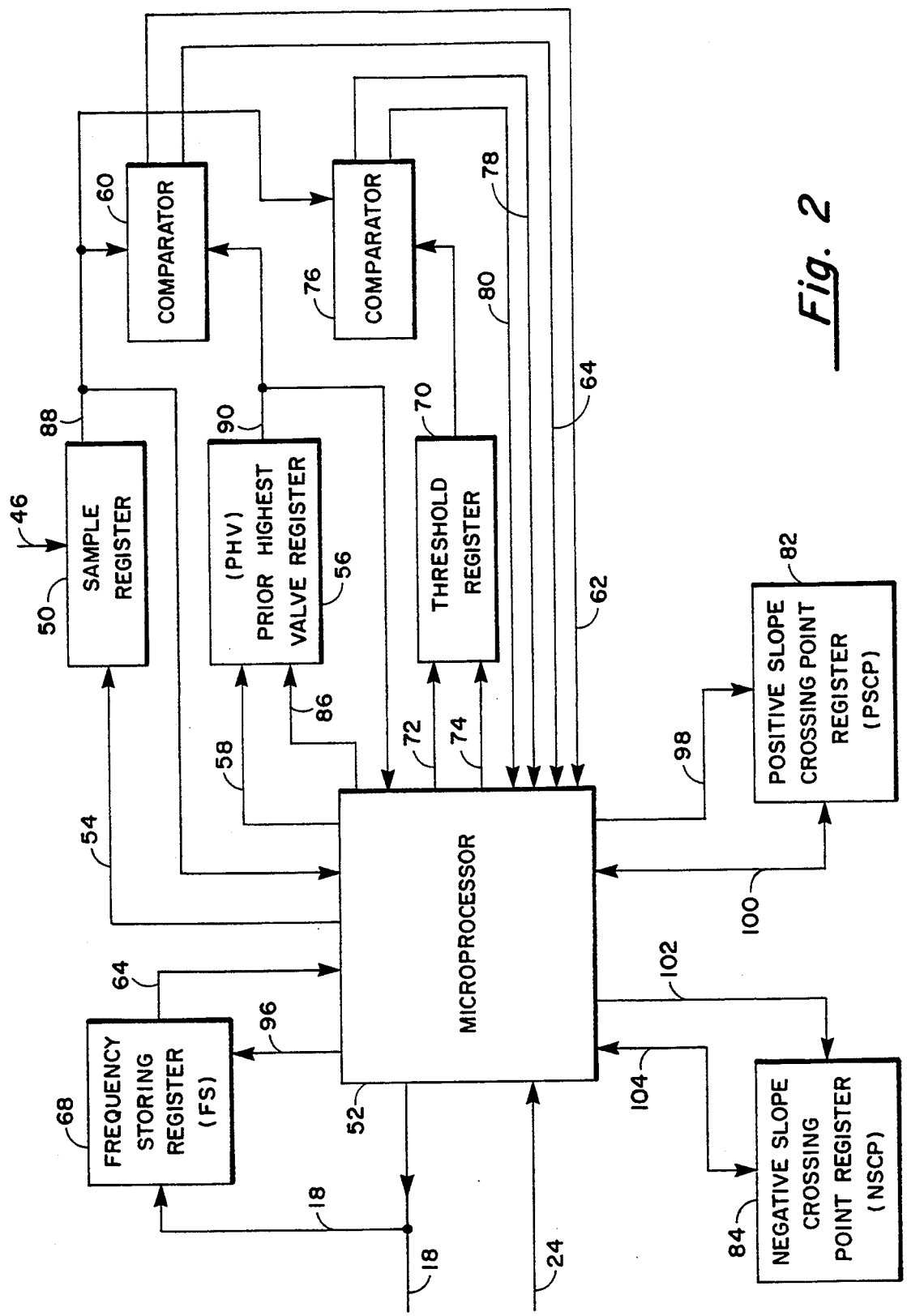
FIG. 2 is a block diagram of a controller used in the receiver of FIG. 1.

Referring again to FIG. 1 and now also to FIG. 2, in response to the initialization frequency on line 24, controller 38 produces two successive sweep digital tuning words on line 18 to provide two passes, or sweeps, of the pass band of BPF 22 through the frequency band of interest. In response to a first pass, i.e. a "coarse" sweep, (initiated at a frequency near, here slightly below, the initialization frequency) the CW signal detector and processor 20 determines the frequency of the CW signal to a coarse degree of resolution. In response to the second pass, i.e. a "fine" sweep, (initiated at a frequency near, here slightly below, the frequency determined during the "coarse" sweep) the CW signal detector and processor 20 determines the frequency of the CW signal to a "fine" degree of resolution. The use of two sweeps results from the finite response time of the YIG filter (BRF 16 and BPF 22) magnetics. Thus a relatively fast sweep is used for the "coarse" sweep to obtain a measure of the frequency of the CW signal to a "coarse" degree of accuracy and the second sweep is performed at a much slower rate to account for the YIG filter (BRF 16 and BPF 22) response time and allow a more precise measure of frequency detection.

The BPF 22 is coupled to controller 38 through detector log video amplifier (DLVA) 40, low pass filter (LPF) 42, and analog to digital converter (ADC) 44, as shown. DLVA 40 has a gain which is a function of the amplitude of its input, i.e. the BPF 22 output signal on line 46. As the amplitude increases, the gain of DLVA 40 decreases. In this way, saturation of LPF 42 and ADC 44 is prevented. As the pass band of the BPF 22 sweeps through the frequency of the CW signal the rise and fall of the energy passing through the BPF 22 results in DLVA 40 producing an output pulse. The output pulse is fed to LPF 42, such LPF 42 limiting the bandwidth of the output pulse. This limiting attenuates the energy in strong, narrow pulses produced by DLVA 40. This helps to prevent the controller 38 from interpreting these strong, narrow pulses as a CW signal. ADC 44 converts the amplitude of the signals passing through LPF 42 to corresponding digital words and sends these digital words to the controller 38 via bus 46.

Referring now to FIG. 2, controller 38 is shown to include a SAMPLE register 50 coupled to bus 46. For each step in the sweep of the pass band frequency of BPF 22, the digital word produced by ADC 44 is stored, via bus 46, in SAMPLE register 50 in response to a control signal produced by microprocessor 52 on line 54. Prior to the initiation of the "coarse" sweep, prior highest value (PHV) register 56 is set, via bus 86, to a system threshold value by a control signal produced by microprocessor 52 on line 58. When a CW signal is detected by pulse signal processor 14 (FIG. 1) the initialization frequency is transferred to microprocessor 52 via line 24. In response thereto, microprocessor 52 begins the "coarse" frequency sweep by producing incremental or decremental steps, here incremental steps, in digital words on line 18 respectively representing incremental or decremental steps, here incremental steps, in frequency over the band of interest. These digital words are converted into corresponding voltages by DAC 25. After each step, the contents of SAMPLE register 50 and the contents of PHV register 56 are compared by comparator 60. The result of this comparison is sent to microprocessor 52 via lines 62 and 64. If the contents of SAMPLE register 50 is greater than the contents of PHV register 56 for two, or more, successive steps in the sweep, the contents of the SAMPLE register 50 is transferred to the PHV register 56 after the second step; and the digital tuning word output on bus 18, which represents the present center frequency of BPF 22, is stored in frequency storing (FS) register 68 in response to a control signal on line 96 produced by microprocessor 52. However, if the contents of SAMPLE register 50 is greater than the contents of PHV register 56 for less than two successive steps in the sweep, the contents of PHV register 56 remains unchanged. If the contents of SAMPLE register 50 is equal to, or less than, the contents of PHV register 56 the contents of PHV register 56 also remains unchanged.

In order for the detected signal to be characterized as a CW signal by the controller 38, the contents of SAMPLE register 50 must be greater than the contents of PHV register 56 for two, or more, successive steps of the "coarse" sweep. That is, when the microprocessor 52 detects two consecutive steps where the value stored in SAMPLE register 50 is greater than the value stored in PHV register 56, the presence of a CW signal is indicated. If any other combination occurs where for one step only the contents of SAMPLE register 50 is greater than the contents of PHV register 56, microprocessor 52 will not interpret this condition as indicative of a presence of a CW signal, and the contents of PHV register 56 remains unchanged. For example, suppose after a first step, the contents of SAMPLE register 50 is greater than the contents of PHV register 56, and after the next step, the contents of SAMPLE register 50 is less than the contents of PHV register 56. Microprocessor 52 would not characterize the signal as a CW signal, and would not update the contents of PHV register 56. Through this process, when the microprocessor 52 has finished stepping the BPF 22 center frequency through the remaining portion of the frequency band of interest, the maximum amplitude of the DLVA 40 output pulses, corresponding to CW signals, over the whole sweep, is stored in PHV register 56, and the corresponding frequency at which this maximum amplitude occurs is stored in a FS register 68. This frequency stored in FS register 68 is the frequency of the CW signal, determined to a "coarse" degree of accuracy. If no CW signals were detected during the "coarse" sweep, then microprocessor 52 tunes the center frequencies of BPF 22 and BRF 16 out of the frequency band of interest, and waits for another initialization frequency from pulse signal processor 14.

Now the "fine" sweep is initiated by controller 38. Microprocessor 52 first calculates a threshold which is preferably 6 dB below the value of the maximum amplitude stored in PHV register 56, and stores this threshold in THRESHOLD register 70. This threshold is stored in THRESHOLD register 70 via bus 72 in response to a control signal from microprocessor 52 on line 74. Microprocessor 52 then sets the BPF 22 center frequency near, here slightly lower than, the frequency of the maximum amplitude occurring during the "coarse" sweep which is stored in FS register 68 and where the output signal of DLVA 40 has an amplitude less than the threshold stored in THRESHOLD register 70. The center frequency of BPF 22 is then incremented or decremented, here incremented or stepped up, as was done during the "coarse" sweep. The duration of each step of the "fine" sweep is longer than the time duration of each step of the "coarse" sweep. The time duration for the "fine" sweep step is long enough for the output signal of BPF 22 to settle to a stable value before the commencement of the next step. In this way, the frequency measurement of the CW signal during the "fine" sweep is more accurate than the frequency measurement of the CW signal during the "coarse" sweep.

Microprocessor 52 steps the center frequency of BPF 22 up or down, here up, until the output of ADC 44, which is stored in SAMPLE register 50, is greater than the threshold value stored in THRESHOLD register 70. The contents of SAMPLE register 50 is compared with the contents of THRESHOLD register 70 by comparator 76. The result of this comparison is transmitted via lines 78 and 80 to microprocessor 52. At this point, called the positive slope crossing point, microprocessor 52 produces control signals on lines 96 and 98 to store the digital tuning word which represents the center frequency of BPF 22 in FS register 68, and transfers this value via buses 64 and 100 to positive slope crossing point (PSCP) register 82. Microprocessor 52 continues stepping up or down, here stepping up, the center frequency of BPF 22 using the same procedure as was used during the "coarse" sweep to store in SAMPLE register 50 the maximum amplitude and frequency at which it occurs for the CW signal as discussed in detail above for the "coarse" sweep. Microprocessor 52 continues the "fine" sweep until the value contained in SAMPLE register 50 falls below the threshold value stored in THRESHOLD register 70. At this point, called the negative slope crossing point, microprocessor 52 produces control signals on lines 96 and 102 to store the digital tuning word in FS register 68, and transfers this value via buses 64 and 104 to negative slope crossing point (NSCP) register 84. Using the contents of the PSCP register 82 and NSCP register 84, microprocessor 52 calculates the arithmetic mean between these two stored frequency values. The arithmetic mean is the frequency of the CW signal calculated to a "fine" degree of accuracy. If no CW signal is detected during the "fine" sweep by controller 38, microprocessor 52 sets the pass band and reject band of BPF 22 and BRF 16 respectively out of the frequency band of interest.

Having detected and confirmed the presence of a CW signal, microprocessor 52 then tunes the center frequencies of both the BPF 22 and BRF 16 to this calculated (to a "fine" degree of accuracy) frequency of the CW signal. Because the center frequency of BRF 16 tracks the center frequency of BPF 22, BRF 16 is also set to the calculated frequency of the CW signal. BRF 16 now provides maximum rejection of the CW signal for pulse signal processor 14 (FIG. 1). However, through the use of a narrow bandwidth of BPF 22 in a channel 12 separate from channel 13, CW signal detector and signal processor 20 (FIG. 1) is able to accurately monitor the strength of the CW signal. Microprocessor 52 then calculates a threshold value preferably 10 dB below the value of the maximum amplitude stored in PHV register 56. The calculated threshold value is stored, in response to a control signal on line 72, in THRESHOLD register 70 via bus 74. The threshold value in THRESHOLD register 70 is then periodically compared by comparator 76 to the contents of SAMPLE register 50 which contains the periodically sampled value of the DLVA 40 output pulse amplitude. When this amplitude stored in SAMPLE register 50 falls below the threshold value stored in THRESHOLD register 70, microprocessor 52 interprets this as the CW signal no longer being present; microprocessor 52 then tunes the pass band and the reject band of BPF 22 and BRF 16 respectively out of the frequency band of interest, and remains in this state until pulse signal processor 14 detects another CW signal within the frequency band of interest.

Referring now to FIGS. 3, 3A and 3B a curve 96 of the center frequency of BPF 22 and BRF 16 versus time for the "coarse" sweep and curve 98 of the center frequencies of BPF 22 and the BRF 16 versus time for the "fine" sweep are shown. FIG. 3A shows the discrete steps in frequency which the center frequencies of BPF 22 and BRF 16 are stepped through by microprocessor 52 during the "coarse" sweep. FIG. 3B shows the discrete steps in frequency which the center frequency of BPF 22 and BRF 16 are stepped through by microprocessor 52 during the "fine" sweep. It is noted that curve 96 for the "coarse" sweep has a much steeper slope than curve 98 for the "fine" sweep. This is due to the fact that the "coarse" sweep time step, that is the time at which the center frequencies of both filters 22 and 16 remain at the same frequency step during the "coarse" sweep, is of much shorter duration than the "fine" sweep time step, that is the time at which the center frequencies of both filters 22 and 16 remain at the same frequency step during the "fine" sweep. As a result, during the "coarse" sweep, curve 96 shows that the center frequencies of both BPF 22 and BRF 16 are increased more quickly than during the "fine" sweep as shown in curve 98.

Referring now to FIG. 4A a curve of the frequency response (i.e. the ratio of the magnitude of an output signal produced from the BPF filter 22 to the magnitude of an input signal fed to BPF filter 22) is shown. It is noted that the center frequency of BPF 22 is at a frequency, $F_0$. When the center frequency, $F_0$, of BPF 22 coincides with the frequency of the CW signal the amplitude of the output signal of BPF 22 is at a maximum value.

Referring now to FIG. 4B a curve of the frequency response of BRF 16 (i.e. the ratio of the magnitude of an output signal produced from the BRF filter 16 to the magnitude of an input signal fed to BRF filter 16) is shown. It is noted that the center frequency of BRF 16 is also at the frequency, $F_0$. When the center frequency, $F_0$, of BRF 16 coincides with the frequency of the CW signal the amplitude of the output signal of such BRF filter 16 is at a minimum value. From the curves in FIG. 4A and FIG. 4B, it is noted that ideally, the center frequency of BPF 22 is exactly equal to the center frequency of BRF 16. It is also noted that the pass band of BPF 22 is typically narrower than the reject band of BRF 16. This difference in bandwidth is to insure proper CW signal rejection by BRF 16 in the case where the center frequencies of both filters 22 and 16 do not coincide precisely.

Having described preferred embodiments of the invention, it will now become apparent to one of skill in the art that other embodiments incorporating their concepts may be used. For example, multiple band reject filters can be cascaded in series in a first channel, and a corresponding multiple of second channels, each having a bandpass filter, can be used to reject and track a corresponding multiple of CW signals. It is felt, therefore, that these embodiments should not be limited to disclosed embodiments, but rather should be limited only by the spirit and scope of the appended claims.

What is claimed is:

1. Apparatus comprising:
   power/divider means for coupling a received signal to a pair of signal channels;
   a first signal channel of said pair of signal channels comprising a band reject filter coupled to said power/divider means, such band reject filter having a reject band with a center frequency tuneable to a frequency within a predetermined frequency band;
   a second signal channel of said pair of signal channels comprising:
   i) a bandpass filter, coupled to said power/divider means, such bandpass filter having a pass band with a center frequency tuneable to the frequency within the predetermined frequency band;
   ii) means responsive to received signals passing through the bandpass filter for determining the frequency of a continuous wave signal within the predetermined frequency band; and
   iii) means responsive to the frequency of the continuous wave signal for tuning both of the center frequencies of the reject band and the pass band to the frequency of the continuous wave signal wherein the tuning means comprises means for tuning the center frequencies of the reject band and the pass band to the frequency of the continuous wave signal having an amplitude larger than amplitudes of all other continuous wave signals within the predetermined frequency band.

2. Apparatus comprising:
   power/divider means for coupling a received signal to a pair of signal channels;
   a first signal channel of said pair of signal channels comprising a band reject filter coupled to said power/divider means, such band reject filter having a reject band with a center frequency tuneable to a frequency within a predetermined frequency band;
   a second signal channel of said pair of signal channels comprising:
   i) a bandpass filter, coupled to said power/divider means, such bandpass filter having a pass band with a center frequency tuneable to the frequency within the predetermined frequency band;
   ii) means responsive to received signals passing through the bandpass filter for determining the frequency of a continuous wave signal within the predetermined frequency band; and
   iii) means responsive to the frequency of the continuous wave signal for tuning both of the center frequencies of the reject band and the pass band to the frequency of the continuous wave signal;
   means responsive to the tuning means for generating a magnetic field coupled to both the bandpass filter and the band reject filter; and
   pulse signal processing means, responsive to said received signals passing through the band reject filter during an initialization phase for detecting a continuous wave signal during the initialization phase and for generating an initialization frequency representative of the frequency of the continuous wave signal detected during the initialization phase.

3. Apparatus as recited in claim 2 wherein said tuning means further comprises:

means, responsive to the generated initialization frequency, for tuning the center frequencies of both the pass band and the reject band to a frequency near the initilization frequency, for sweeping the center frequency of the bandpass filter from the frequency near the initialization frequency through the frequencies of the predetermined frequency band, for calculating the frequency of the continuous wave signal passing through the bandpass filter, such continuous wave signal having a largest amplitude within a range of frequencies extending from the frequency near the initialization frequency through highest frequencies of thepredetermined frequency band, and for detecting an absence of the continuous wave signal and for tuning, in response to such detection, the pass band and the reject band to a frequency outside of the predetermined frequency band.

4. Apparatus comprising:
a) power/divider means for coupling a received signal to a pair of signals channels;
b) a first signal channel of said pair of signal channels comprising:
   i) a band reject filter, coupled to said power/divider means, such band reject filter having a reject band with a center frequency tuneable, in response to a control signal, to a frequency within a predetermined frequency band; and
   ii) a pulse signal processor, coupled to the band reject filter, responsive to received signals passing through the band reject filter for distinguishing between pulsed and continuous wave signals, and for determining the frequency of a distinguished continuous wave signal;
c) a second signal channel of said pair of signal channels comprising:
   i) a bandpass filter, coupled to said power/divider means, such bandpass filter having a pass band with a center frequency tuneable, in response to the control signal, to a frequency within the predetermined frequency band;
   ii) a continuous wave signal detector and processor coupled to said bandpass filter, said continuous wave signal detector and processor comprising: a controller for generating the control signal.

5. Apparatus as recited in claim 4 further comprising: means responsive to said control signal for generating a magnetic field and wherein the bandpass filter, and the band reject filter are coupled to the magnetic field.

6. Apparatus as recited in claim 5 wherein the pulse signal processor produces an initialization frequency for the controller in response to the distinguished continuous wave signal.

7. A method comprising the steps of:
a) coupling received signals to a bandpass filter having a pass band with a center frequency and a band reject filter having a reject band with a center frequency, both of the center frequencies being frequency tuneable;
b) tuning, in response to received signals passing through the bandpass filter, both of the center frequencies of the pass band and the reject band to the frequency of a continuous wave signal within a predetermined frequency band;
c) determining, in response to the received signals passing through the band reject filter, the frequency of the continuous wave signal within the predetermined frequency band and having the greatest amplitude;
d) generating an initialization frequency equal to the frequency of the continuous wave signal passing through the band reject filter and having the greatest amplitude;
e) tuning, in response to the initialization frequency, the center frequency of the pass band to a frequency near the initialization frequency;
f) coarsely sweeping the center frequency of the pass band, such sweep extending from the frequency near the initialization frequency through frequencies of the predetermined frequency band, each step of the coarse sweep having a first finite time duration;
g) storing during the coarse sweep both the frequency of the continuous wave signal passing through the bandpass filter and having the greatest amplitude for at least two successive steps of the coarse sweep and the greatest amplitude; and
h) tuning the center frequencies of the pass band and the reject band to the frequency of the continuous wave signal passing through the bandpass filter and having the greatest amplitude for said at least two successive steps of the coarse sweep.

8. Method of claim 7 further comprising the steps of:
a) calculating a first threshold a first predetermined amount below the greatest amplitude stored during the coarse sweep;
b) finely sweeping the center frequency of the pass band from a frequency below a positive slope crossing frequency to a frequency above a negative slope crossing frequency;
c) storing during the fine sweep the positive slope crossing frequency and the negative slope crossing frequency;
d) calculating a mean frequency between the positive slope crossing frequency and the negative slope crossing frequency;
e) tuning the center frequencies of the pass band and the reject band to the mean frequency;
f) generating a second threshold a second predetermined amount below the greatest amplitude;
g) detecting an absence of the continuous wave signal passing through the bandpass filter and having the greatest amplitude when the amplitude of the continuous wave signal passing through the bandpass filter and having the greatest amplitude falls from above the second threshold to below the second threshold; and
h) tuning in response to the absence detection the center frequencies of the pass band and the reject band to a frequency outside of the predetermined frequency band.

* * * * *